United States Patent [19]
Robinson

[11] Patent Number: 5,853,071
[45] Date of Patent: Dec. 29, 1998

[54] BLEED VALVE FOR BLEEDING FLUID FROM A HYDRAULIC CIRCUIT

[75] Inventor: Norman F. Robinson, Manhattan Beach, Calif.

[73] Assignee: McDonnell Douglas Corporation, Huntington Beach, Calif.

[21] Appl. No.: 890,982

[22] Filed: Jul. 10, 1997

[51] Int. Cl.[6] .............................. B60T 11/26; F16K 1/00
[52] U.S. Cl. .............................. 188/352; 303/86; 60/584; 251/321; 251/323
[58] Field of Search ............................... 188/352; 60/584; 137/465, 466, 614.17; 251/221, 225, 226, 227, 289, 319, 321, 323, 332, 351, 354; 303/86

[56] References Cited

U.S. PATENT DOCUMENTS

| | | |
|---|---|---|
| 630,184 | 8/1899 | Cooke . |
| 712,249 | 10/1902 | Briggs, Jr. .................................. 303/86 |
| 834,837 | 10/1906 | Miner . |
| 950,801 | 3/1910 | Barr . |
| 981,842 | 1/1911 | Cordley . |
| 1,570,187 | 1/1926 | Rohner . |
| 2,255,676 | 9/1941 | O'Reilly ................................. 188/352 |
| 2,574,036 | 11/1951 | Henchert ................................. 299/150 |
| 2,577,654 | 12/1951 | Gates ...................................... 251/137 |
| 3,425,750 | 2/1969 | Deane .......................................... 303/6 |
| 3,675,896 | 7/1972 | Mercier ................................... 251/321 |
| 4,318,460 | 3/1982 | Kosiuski ................................... 60/584 |
| 4,470,577 | 9/1984 | Warwick ................................. 188/352 |
| 4,474,272 | 10/1984 | Omlie ...................................... 188/352 |
| 4,664,451 | 5/1987 | Sakaguchi et al. ..................... 188/352 |
| 4,902,077 | 2/1990 | Belavt et al. ........................... 188/352 |
| 5,273,141 | 12/1993 | Veret et al. ............................. 188/352 |
| 5,605,384 | 2/1997 | Johnston et al. ..................... 303/133.1 |

FOREIGN PATENT DOCUMENTS 0291285  11/1988  European Pat. Off. ............... 188/352

*Primary Examiner*—Robert J. Oberleitner
*Assistant Examiner*—Chris Schwartz
*Attorney, Agent, or Firm*—Senniger, Powers, Leavitt & Roedel

[57] ABSTRACT

A bleed valve for bleeding fluid from a hydraulic circuit comprises a valve body having a valve passage therethrough adapted for fluid communication with the hydraulic circuit, a valve seat on the valve body, and a sealing assembly. The sealing assembly has a valve closure connected to a valve stem and adapted for sealing engagement with the valve seat. The sealing assembly is moveable between a closed sealing position in which the valve closure sealingly engages the valve seat to block fluid flow through the valve passage and an open position in which the valve closure is spaced from the valve seat to permit fluid flow through the valve passage. A valve fitting on the valve body has an outlet port for exhausting fluid from the valve passage. The fitting is moveable relative to the valve body for selectively positioning the outlet port with respect to the valve body. The outlet port is in fluid communication with the valve passage regardless of its relative position with respect to the valve body.

15 Claims, 2 Drawing Sheets

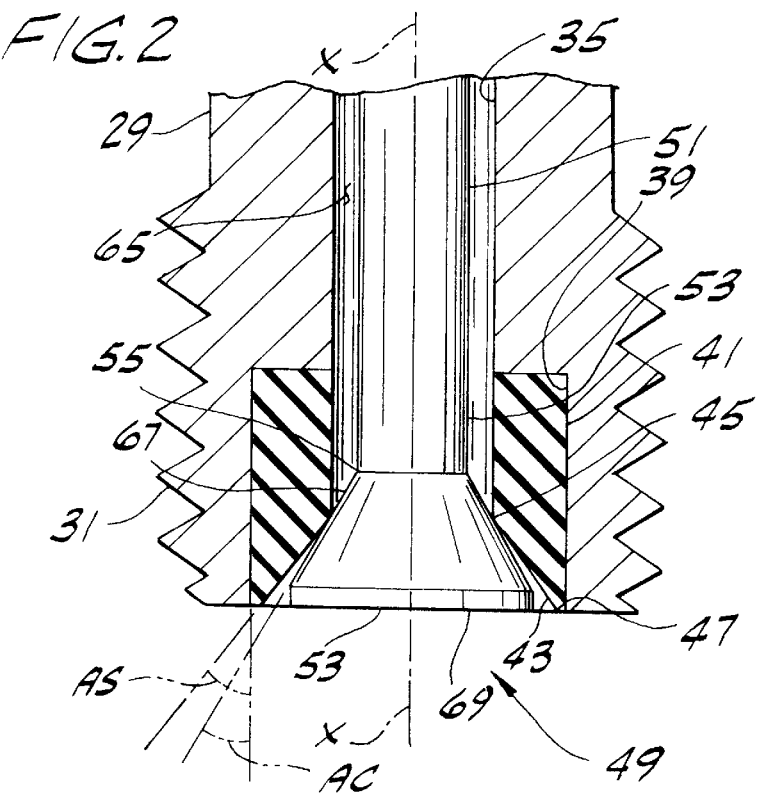
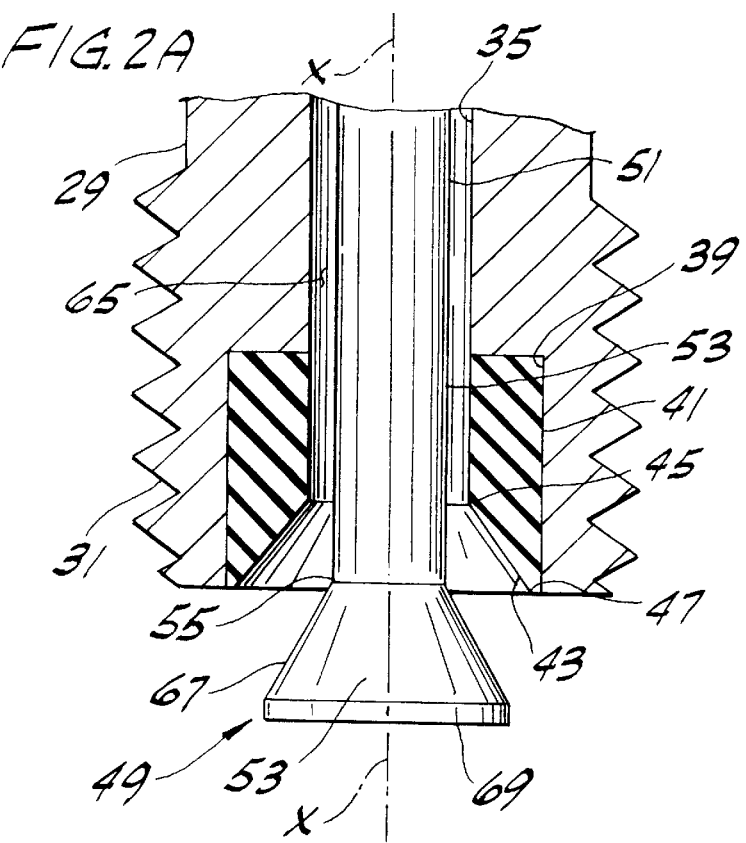

BLEED VALVE FOR BLEEDING FLUID FROM A HYDRAULIC CIRCUIT

BACKGROUND OF THE INVENTION

This invention relates generally to valve assemblies and, more particularly, to bleed valves for bleeding fluid from a hydraulic circuit.

Conventional hydraulic systems, such as those found in automobile and aircraft braking systems, generally include a closed-loop hydraulic circuit in which pressurized hydraulic fluid is pumped through a fluid line in response to an operator's input. The pressurized fluid applies sufficient pressure against an operating component of the system, such as the brakes, to move the operating component. Air or other gases in a hydraulic circuit can negatively effect the compressibility of the hydraulic fluid and thus the operation of the circuit. Newly assembled circuits and circuits that have been opened, such as for servicing, are particularly susceptible to this problem. To ensure reliability of the system, the gas must occasionally be bled from the hydraulic circuit. Since gas in an inactive hydraulic circuit predominantly seeks pockets at high points in the system, it is known to provide one or more bleed valves in the fluid line at the high points of the circuit to bleed excess gas from the line. To perform the bleeding operation, a bleed hose is typically connected to the bleed valve and the valve is opened to allow the air or gas to exhaust from the fluid line through the valve and out through the bleed hose.

Bleed valves used in aircraft braking systems are generally located at a point where the landing gear attaches to the aircraft. In commercial aircraft, multiple bleed valves may be required to assure adequate bleeding of all fluid lines. These bleed valves are typically installed adjacent various structural components, operating components, fluid lines and wiring in compact arrangements. In this limited space, the bleed valves are often hard to install and may be oriented such that connecting the bleed hose to the valve is difficult, making installation and servicing frustrating and time consuming.

In addition, aircraft braking systems are typically high pressure systems in which fluid pressure in the fluid line increases from an inactive pressure of approximately 500 psi (35 kg/cm$^2$) to an active pressure of approximately 3000 psi (211 kg/cm$^2$) when the hydraulic circuit is activated by the operator's input. Bleed valves currently used in aircraft braking systems include a bleeder screw that the operator turns, via an Allen wrench or end wrench, to open and close the valve. However, because of the high fluid pressure in the fluid line, attempting bleeding operations while the circuit is active can lead to forceful spraying of the hydraulic fluid from the valve. The bleeder screws in current use lack any indication of whether the circuit is inactive or active and may be used to inadvertently open the valve while the circuit is active. Moreover, because the bleeder screw must be manually turned to close the valve, the valve may inadvertently left open while the circuit is active, again leading to forceful spraying of fluid from the valve.

SUMMARY OF THE INVENTION

The present invention overcomes the deficiencies of the prior art by providing a bleed valve which is accessible in tight spaces and indicates to the operator whether the hydraulic circuit is inactive or active. Among the features of the present invention may be noted the provision of such a bleed valve that is selectively positionable during and after installation in a fluid line to facilitate access to the valve. In addition, the present invention renders the valve difficult to open while the hydraulic circuit is active so that inadvertent opening of the valve is inhibited. The bleed valve is also self-closing to eliminate the risk of the valve being left open when the hydraulic circuit is activated. The bleed valve further eliminates the need for maintaining tight manufacturing tolerances, thereby increasing consistency of performance from valve to valve.

Generally, a bleed valve of this invention is for bleeding fluid from a hydraulic circuit. The bleed valve comprises a valve body having a valve passage therethrough adapted for fluid communication with the hydraulic circuit, a valve seat on the valve body, and a sealing assembly. The sealing assembly comprises a valve stem disposed in the valve passage and a valve closure connected to the valve stem adapted for sealing engagement with the valve seat. The sealing assembly is moveable along a longitudinal axis of the valve passage between a closed sealing position in which the valve closure sealingly engages the valve seat to block fluid flow through the valve passage and an open position in which the valve closure is spaced from the valve seat to permit fluid flow through the valve passage. A valve fitting on the valve body has an outlet port for exhausting fluid from the valve passage. The valve fitting is moveable relative to the valve body for selectively positioning the outlet port with respect to the valve body. The outlet port is in fluid communication with the valve passage regardless of its relative position with respect to the valve body.

In another aspect of the invention, a bleed valve is used for bleeding fluid from a hydraulic circuit in which the circuit contains fluid under pressure and is operable between an inactive mode and an active mode. The fluid pressure is substantially increased in the active mode. The valve comprises a valve body having a valve passage therethrough adapted for fluid communication with the hydraulic circuit, a valve seat on the body, and a sealing assembly. The sealing assembly comprises a valve stem disposed in the valve passage, a valve closure connected to the valve stem adapted for sealing engagement with the valve seat, and a push button connected to an outer end of the valve stem opposite the valve closure. The sealing assembly is moveable along a longitudinal axis of the valve passage between a closed sealing position in which the valve closure sealingly engages the valve seat to block fluid flow through the valve passage and an open position in which the valve closure is spaced from the valve seat to permit fluid flow through the valve passage. The push button projects out from the valve body so that it is accessible for manually moving the sealing assembly to its open position. The valve closure has an end surface adapted for exposure to the pressurized fluid of the hydraulic circuit whereby the pressurized fluid acts against the valve closure end surface to urge the sealing assembly toward its closed sealing position. The amount of force needed for moving the sealing assembly to its open position is greater than the biasing force of the fluid pressure. The end surface of the valve closure is sized so that in the inactive mode of the hydraulic circuit the biasing force of the fluid pressure provides low resistance against manual movement of the sealing assembly to its open position, and in the active mode of the hydraulic circuit the biasing force of the fluid pressure is substantially increased to provide substantial resistance against manual movement of the sealing assembly to its open position. The substantial resistance against manual movement indicates that the hydraulic circuit is in its active mode.

BRIEF DESCRIPTION OF THE DRAWINGS

FIG. 2 is an enlarged fragmentary view of the bleed valve of FIG. 1 showing a sealing assembly in a closed sealing position;

FIG. 2A is a view similar to FIG. 2 with the sealing assembly in an open position.

Corresponding reference characters indicate corresponding parts throughout the several views of the drawings.

DESCRIPTION OF THE PREFERRED EMBODIMENT

Figure 1:
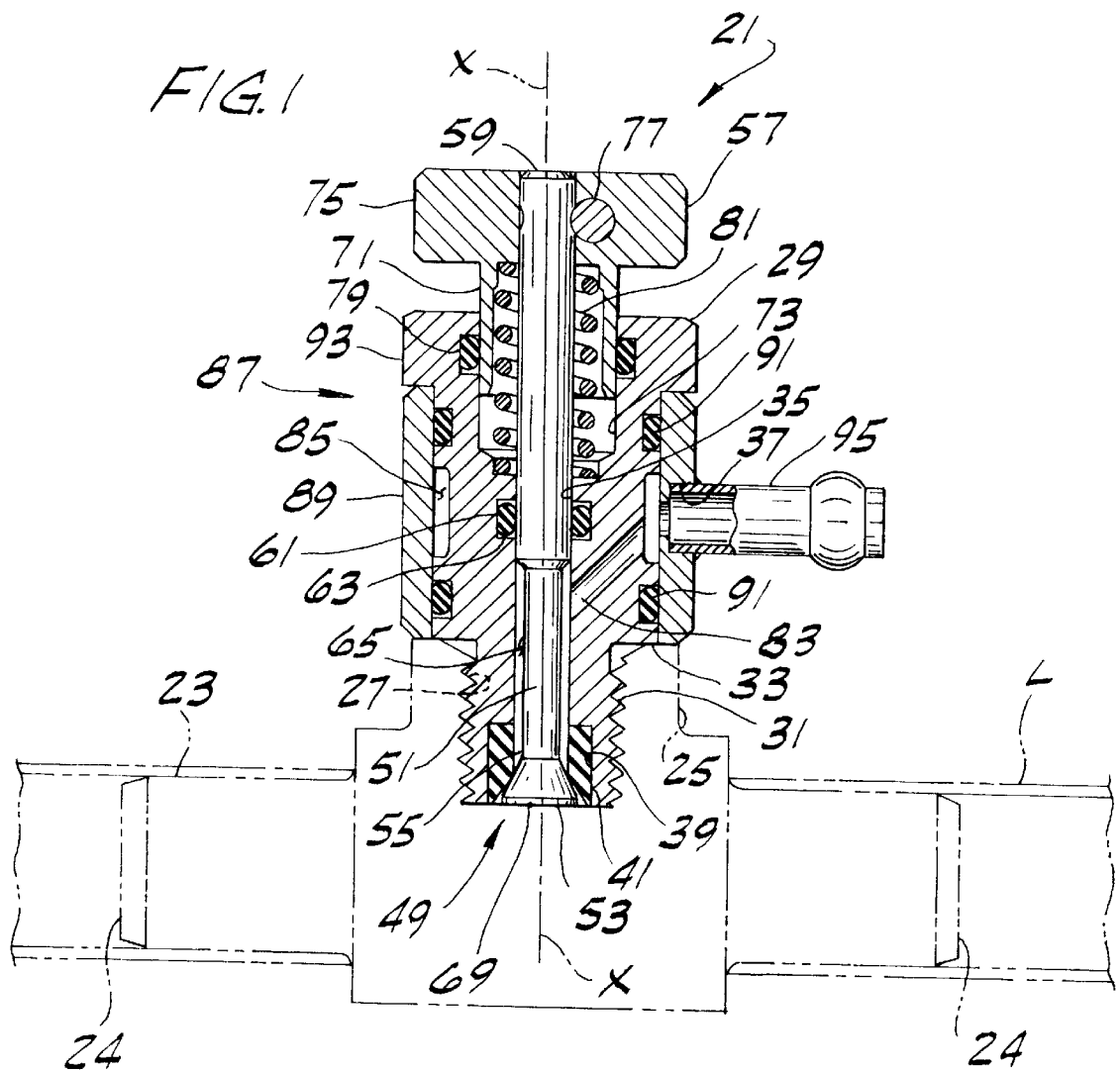
FIG. 1 is a cross-sectional view of a bleed valve of the present invention installed in a T-fitting of a hydraulic circuit.
Figure 3:
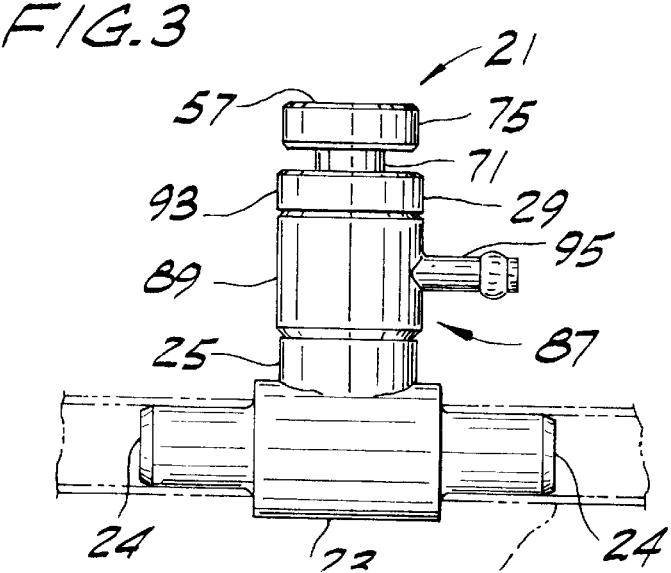
FIG. 3 is a side elevational view of the bleed valve of FIG. 1.

Referring now to the drawings, and first to FIG. 1, a bleed valve of the present invention is generally indicated at 21. The bleed valve 21 is particularly useful for bleeding fluids such as air or other gases from a hydraulic circuit in which hydraulic fluid is circulated through a fluid line L (shown in phantom in FIG. 1) by a suitable pump (not shown) in response to an operator's input to the circuit. For example, the circuit may be used to operate an aircraft hydraulic brake system which is selectively operable between an inactive mode in which pressurized hydraulic fluid is contained in the fluid line L of the circuit at a pressure of approximately 500 psi (35 kg/cm$^2$) and an active mode in which the hydraulic fluid is pumped through the fluid line at a pressure of approximately 3000 psi (211 kg/cm$^2$). The valve may also be installed at the high point of a hydraulic circuit adjacent to a system reservoir. It is to be understood that the fluid pressure in the fluid line may be higher or lower than the above pressures (in the active or inactive mode) without departing from the scope of the invention.

As shown in FIG. 1, a T-fitting 23 having opposing open ends 24 is secured in the fluid line L by conventional methods with the open ends oriented in the direction of flow of the hydraulic fluid through the fluid line. The fitting 23 has a boss 25 intermediate its open ends 24 projecting transverse to the direction of flow of the hydraulic fluid through the fitting. The T-fitting 23 is preferably located at the highest point in the hydraulic circuit, or brake circuit, with the boss 25 projecting up from the fitting so that when the circuit is in its inactive mode, air in the fluid line generally forms an air pocket adjacent the boss of the T-fitting. An opening 27 in the boss 25 is internally threaded for receiving the bleed valve 21 and provides fluid communication between the valve body and the fluid line L. The boss 25 of the T-fitting 23 may also be formed integral with the valve and have end fittings for connection with fluid lines L. The ends 24 of the fitting 23 may also be connected to the fluid lines L with a brazed connection or may be connected by flared or flareless fittings as is well known in the art.

The bleed valve 21 comprises a valve body 29 having an inner end 31 which is externally threaded for threadably engaging the internal threads of the opening 27 in the boss 25 to secure the valve body to the T-fitting 23. An external shoulder 33 formed on the valve body 29 generally outward of the external threads seats against the boss 25 around the opening 27 to properly locate the inner end 31 of the valve body in the T-fitting 23. In the illustrated embodiment, the inner end 31 of the valve body 29 is generally co-terminal with the bottom of the boss opening 27 in communication with the fluid line L. A valve passage 35 extends axially through the valve body 29 and is in fluid communication with the fluid line L at the T-fitting 23. The valve 21 has an outlet port 37 for exhausting air from the bleed valve. The valve body 29 may be formed from aluminum, steel, titanium or any other suitable material.

As shown in FIG. 2, the inner end 31 of the valve passage 35 is counterbored to form a cavity 39 for receiving an annular insert which defines a valve seat 41. The valve passage 35 extends through the valve seat 41. The valve seat 41 is secured within the cavity 39 by a tight friction fit or other suitable means (e.g., adhesive) and is preferably constructed of a resilient, non-metallic material capable of withstanding high temperature and high compressive loading without permanent deformation. The seat 41 may be formed from a polyimide material capable of withstanding temperatures up to 275 degrees fahrenheit (135 degrees celsius) and having a compressive yield in the range of 13,000 to 40,000 psi (914 to 2812 kg/cm$^2$). The valve seat 41 has a frusto-conical surface 43 sloping radially outward with respect to the valve passage 35 from a narrower end 45 to a wider end 47 substantially co-terminal with the inner end 31 of the valve body 29 (FIG. 2). The frusto-conical surface 43 defines a valve seat taper angle AS relative to a longitudinal axis X of the valve passage 35.

A sealing assembly, generally indicated at 49, is disposed in the valve passage 35 and includes a valve stem 51 extending the length of the passage and a valve closure 53 connected to an inner end 55 of the valve stem in opposing relationship with the valve seat 41. The sealing assembly 49 is slidably movable along longitudinal axis X of the valve passage 35 between a closed sealing position in which the valve closure 53 sealingly engages the valve seat 41 to block fluid flow through the valve passage 35, and an open position (FIG. 2A) in which the valve closure is spaced from the valve seat to permit fluid flow through the passage.

The sealing assembly 49 also includes a push button 57 connected to an outer end 59 of the valve stem 51 (FIG. 1). The push button 57 projects out from the valve body 29 so that it is readily accessible for manually moving the sealing assembly 49 to its open position. The push button may also be automatically activated by an electronic or hydraulic valve assembly during start-up of the aircraft hydraulic system, for example.

The valve stem 51 is generally cylindrical and sized for a close sliding fit with the valve body 29 along an outer portion of the valve stem. An O-ring 61 seated in an internal annular groove 63 in the valve body 29 engages the valve stem 51 to seal the valve 21 against leakage. A lower portion of the valve stem 51 has a substantially reduced diameter to permit fluid to flow through the valve passage 35 in an annular gap 65 between the valve body 29 and the lower portion of the valve stem 51 when the sealing assembly 49 is in its open position.

With reference to FIG. 2, the valve closure 53 has a generally frusto-conical shape including a sloped outer surface 67 that defines a valve closure taper angle AC relative to the longitudinal axis X of the valve passage 35. The sloped outer surface 67 of the valve closure 53 opposes the valve seat surface 43 and is adapted for sealing engagement with the valve seat surface when the sealing assembly 49 is in its closed position. The valve closure taper angle AC is less than the valve seat taper angle AS so that the valve closure surface 67 engages the valve seat surface 43 generally only at (i.e., adjacent to) the narrower end 45 of the valve seat surface.

The valve closure 53 has an end surface 69 which is generally flat and aligned in co-terminal relationship with the inner end 31 of the valve body 29, the end surface thus being exposed to air and hydraulic fluid adjacent the opening 27 in the boss 25 of the T-fitting 23 (FIG. 1). The pressurized fluid acts against the flat end surface 69 of the valve closure 53 to urge the sealing assembly 49 to its closed sealing position. In the preferred embodiment, the fluid pressure acts against the end surface 69 with approximately 10 lbs (44.48 N) of force when the hydraulic circuit is in its inactive mode (e.g., pressurized to 100–500 psi (7–35 kg/cm$^2$)). In the active mode of the hydraulic circuit (e.g., pressurized to 3000 psi (211 kg/cm$^2$) ), the substantially increased fluid pressure acts against the end surface 69 with approximately 60 lbs (267 N) of force.

As shown in FIG. 1, the push button 57 includes a generally cylindrical spring housing 71 sized for seating within a recess 73 formed in the upper end of the valve body 29, and a head 75 on the housing connected to the outer end 59 of the valve stem 51 by a suitable bolt 77 or spring pin, the arrangement being such that the push button moves as a unit with the valve stem 51 and closure 53 relative to the valve body. A suitable O-ring seal 79 between the spring housing 71 and the valve body 29 seals the valve 21 against leakage. A coil spring 81 is disposed in the spring housing 71 and seats within the recess 73 in the upper end of the valve body 29 to bias the sealing assembly 49 to its closed sealing position. In the illustrated embodiment, the biasing force of the spring 81 is approximately 2–3 lbs (9–13 N) and is sufficient only to overcome the friction between the sealing assembly 49 and the O-rings 61, 79. The fluid pressure in the fluid line L provides the primary force urging the sealing assembly 49 to its closed sealing position.

The valve body 29 has an outlet passage 83 extending from the annular gap 65 in the valve passage 35 to an external annular groove 85 extending circumferentially around the valve body. A valve fitting, generally indicated at 87, is mounted on the valve body 29 for rotation about the longitudinal axis X of the valve passage 35. As shown in FIG. 1, the valve fitting 87 comprises a sleeve 89 that overlies the external annular groove 85 in close-contact relationship with the valve body 29 adjacent the groove so that air in the outlet passage 83 is directed to flow around the valve body within the external annular groove. Suitable O-ring seals 91 are disposed between the valve body 29 and sleeve 89 on opposite sides of the groove 85 for sealing the valve 21 against external leakage. The upper end of the valve body 29 has a radial flange 93 which A defines a shoulder against which one end of the sleeve 89 abuts. The opposite end of the sleeve 89 abuts against the boss 25 of the T-fitting 23 when the valve 21 is installed in the fitting to prevent longitudinal movement of the sleeve 89 with respect to the valve body 29. However, the sleeve 89 may be arranged and secured on the valve body 29 without abutting against the flange 93 or the boss 25 of the T-fitting 23 and still be within the scope of this invention.

The outlet port 37 of the valve 21 comprises an opening in the sleeve 89 communicating with the external annular groove 85 in the valve body 29, the arrangement being such that fluid in the valve passage 35 can exit the valve via the outlet passage 83, the external annular groove 85 and the outlet port. A bleed hose connector 95 projects radially outward from the outlet port 37 of the sleeve 89 and is adapted for connection to a bleed hose (not shown) for exhausting fluid from the valve body 29. Rotation of the sleeve 89 about the longitudinal axis X of the valve passage 35 permits selective positioning of the outlet port 37 with respect to the valve body.

While the external annular groove 85 is shown as being in the valve body 29, it is understood that the groove 85 may extend internally within the sleeve 89 without departing from the scope of this invention. In addition, it is contemplated that the valve fitting 87 and groove 85 may extend only partially around the valve body 29 (i.e. the groove is arcuate rather than annular) whereby the valve fitting is rotatable through a rotation of less than 360 degrees without departing from the scope of this invention.

In operation, the bleed valve 21 is connected to the T-fitting 23 by threading the inner end 31 of the valve body 29 into the boss opening 27 until the external shoulder 33 on the valve body seats against the boss 25. To bleed air from the hydraulic circuit, the sleeve 89 is rotated about the longitudinal axis X of the valve passage 35 until the bleed hose connector 95 is sufficiently accessible for connection of the bleed hose. Since the external annular groove 85 extends fully around the valve body 29 (in the preferred embodiment), the outlet port 37 remains in fluid communication with the groove and the outlet passage 83 regardless of the selected angular position of the outlet port with respect to the valve body. After connecting the bleed hose, the hydraulic circuit is operated in its active mode to circulate hydraulic fluid through the fluid line L. The pressurized fluid acts against the exposed end surface 69 of the valve closure 53 to urge the sealing assembly 49 to its closed sealing position with a force of approximately 60 lbs. (267 N), for example. To overcome this force, an operator has to push inward against the push button 57 with more than 60 lbs. of force before the sealing assembly 49 will open. The magnitude of this resistance provides a clear indication to the operator that the hydraulic circuit is in its active mode and should not be bled.

Once the hydraulic circuit is returned to its inactive mode, air in the fluid line L will move to the highest point in the line, which is adjacent the opening 27 of the boss 25 of the T-fitting 23. In the inactive mode of the hydraulic circuit, pressurized fluid acts against the exposed end surface 69 of the valve closure 53 to urge the sealing assembly 49 to its closed sealing position with a reduced force of approximately 10 lbs (44 N). Accordingly, the push button 57 can easily be pushed inward to its open position, providing a clear indication that the hydraulic circuit is in its inactive mode. In the open position of the sealing assembly 49, the valve closure 53 is spaced away from the valve seat 41 to permit air in the fluid line L to flow into the annular gap 65 where it is directed into the outlet passage 83, the external annular groove 85 and thence to the outlet port 37 for exhaust into the bleed hose (FIG. 2A). When bleeding is complete, the operator releases the push button 57, whereby the fluid pressure and spring 81 urge the sealing assembly 49 back to its closed position (FIG. 2). It is to be understood that the force required to move the sealing assembly to its closed position may vary without departing from the scope of this invention.

It will be observed from the foregoing that the bleed valve 21 of this invention has numerous advantages. The location of the outlet port 37 on the rotatable valve fitting 87 allows an installer to hold the valve fitting 87 and bleed hose connector 95 stationary while the valve body 29 is turned relative to the valve fitting 87 for screwing the valve body into the T-fitting 23, making it easier to install the valve in the limited space available in the aircraft. The outlet port 37 can also be rotated with respect to the valve body 29 after installation in the T-fitting 23 to permit the operator to move the bleed hose connector 95 to its most accessible position for connecting the bleed hose, resulting in easier, less time consuming bleeding operations.

In addition, mounting the valve fitting 87 on the valve body 29 eliminates the need for tight tolerances in manufacturing the T-fitting 23 and the valve body 29. When the valve body 29 is threaded into the T-fitting 23, it is not necessary that the valve body extend into the opening 27 of the boss 25 at a specific distance in order for the outlet port 37 to align properly with the external annular groove 85 of the valve body. Rather, the outlet port 37 is always aligned with the groove 85, regardless of the relative position of the valve body 29 with respect to the T-fitting 23.

Moreover, because the fluid pressure in the fluid line L provides the primary force for urging the sealing assembly 49 to its closed position, the substantial increase in fluid pressure when the hydraulic circuit is in its active mode makes it difficult for an operator to manually overcome the force to move the sealing assembly 49 to its open position. Thus, when the operator attempts to push inward against the push button 57, the substantial resistance against manual movement clearly indicates to the operator that the circuit is in its active mode and that bleeding should not be performed, thereby reducing the risk of injury to the operator and inhibiting forceful spraying of hydraulic fluid from the valve 21.

The polyimide material of which the valve seat 41 is constructed provides for efficient operation at high temperatures, such as up to 275 degrees fahrenheit (135 degrees celsius), and at high pressures, such as greater than 3000 psi (211 kg/cm$^2$), without sustaining permanent deformation, thus reducing the risk of mechanical failure of the valve 21. Also, the difference in taper angle AS, AC between the valve closure 53 and the valve seat 41 promotes engagement of the valve closure generally only with the narrower end 45 of the valve seat surface 43. This reduces the need for tight tolerances in manufacturing the valve closure 53 and valve seat 41 and increases consistency of operation from valve 21 to valve.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A bleed valve for bleeding fluid from a hydraulic circuit, the valve comprising:

a valve body having a valve passage therethrough adapted for fluid communication with the hydraulic circuit;

a valve seat on the valve body;

a sealing assembly comprising a valve stem disposed in the valve passage and a valve closure connected to the valve stem adapted for sealing engagement with the valve seat, the sealing assembly being moveable along a longitudinal axis of the valve passage between a closed sealing position in which the valve closure sealingly engages the valve seat to block fluid flow through the valve passage and an open position in which the valve closure is spaced from the valve seat to permit fluid flow through the valve passage; and a valve fitting on the valve body having an outlet port for exhausting fluid from the valve passage, the valve fitting being moveable relative to the valve body for selectively positioning the outlet port with respect to the valve body, the outlet port being in fluid communication with the valve passage regardless of its relative position with respect to the valve body;

the valve seat having a frusto-conical surface tapering from a wider end to a narrower end, the valve seat surface defining a taper angle of the valve seat relative to the longitudinal axis of the valve passage, the valve closure having a frusto-conical shape to define a taper angle of the valve closure relative to the longitudinal axis of the valve passage, the valve closure taper angle being substantially less than the valve seat taper angle so that in the closed position of the sealing assembly the valve closure engages the valve seat generally only at the narrower end of the valve seat surface.

2. A bleed valve as set forth in claim 1 wherein the valve fitting is mounted on the valve body for rotation about the longitudinal axis of the valve passage so that the outlet port is rotatably positionable with respect to the valve body.

3. A bleed valve as set forth in claim 2 further comprising a groove between the valve body and the valve fitting, and an outlet passage providing fluid communication between the groove and the valve passage, the valve fitting being in close-contact sealing relationship with the valve body on opposite sides of the groove, the outlet port of the valve fitting being in fluid communication with the groove at any rotational position of the fitting relative to the valve body.

4. A bleed valve as set forth in claim 3 wherein the groove is an annular groove extending circumferentially around the valve body, and wherein the valve fitting comprises a sleeve capable of being rotated 360 degrees about the longitudinal axis of the valve passage with respect to the valve body.

5. A bleed valve as set forth in claim 1 wherein the sealing assembly further comprises a push button connected to an end of the valve stem opposite the valve closure, and a spring for urging the push button outward from the valve body to bias the sealing assembly in its closed sealing position, the push button projecting out from the valve body so that it is accessible for manually moving the sealing assembly to its open position.

6. A bleed valve as set forth in claim 5 wherein the valve closure further comprises an end surface adapted for exposure to pressurized fluid of the hydraulic circuit whereby the pressurized fluid acts against the end surface to urge the sealing assembly toward its closed position, the end surface being sized such that the biasing force of the fluid pressure is substantially greater than the biasing force of the spring.

7. A bleed valve as set forth in claim 6 wherein the end surface of the valve closure is sized so that when the hydraulic circuit is in an inactive, low pressure mode the biasing force of the fluid pressure is in the range of 5–20 lbs to provide low resistance against manual movement of the sealing assembly to its open position, and when the hydraulic circuit is in an active, high pressure mode the biasing force of the fluid pressure is at least 50 lbs to provide substantial resistance against such manual movement of the sealing assembly to its open position whereby the substantial resistance against manual movement indicates that the hydraulic circuit is in its active mode.

8. A bleed valve as set forth in claim 1 wherein the valve seat is constructed of a polyimide material.

9. A hydraulic circuit for use in aircraft brake systems, the hydraulic circuit containing fluid under pressure and being operable in an inactive mode and an active mode, the fluid pressure in the hydraulic circuit being less than about 500 psi in the inactive mode and being substantially increased above 500 psi in the active mode, the hydraulic circuit comprising:

a fluid line for directing fluid under pressure through the circuit, the fluid line having an opening therein for exhausting fluid from the fluid line; and a bleed valve adapted for connection to the fluid line in said opening for bleeding fluid from the fluid line via the opening, the bleed valve comprising a valve body having a valve passage therethrough adapted for fluid communication with the fluid line;

a valve seat on the valve body;

a sealing assembly comprising a valve stem disposed in the valve passage, a valve closure connected to the valve stem adapted for sealing engagement with the valve seat, and a push button connected to an outer end of the valve stem opposite the valve closure, the sealing assembly being moveable along a longitudinal axis of the valve passage between a closed sealing position in which the valve closure sealingly engages the valve seat to block fluid flow through the valve passage and an open position in which the valve closure is spaced from the valve seat to permit fluid flow through the valve passage, the push button projecting out from the valve body so that it is accessible for manually moving the sealing assembly to its open position;

the valve closure having an end surface adapted for exposure to the pressurized fluid in the fluid line whereby the pressurized fluid acts against the valve closure end surface to urge the sealing assembly toward its closed position, the amount of force needed for moving the sealing assembly to its open position being greater than the biasing force of the fluid pressure;

the end surface of the valve closure being sized so that in the inactive mode of the hydraulic circuit the biasing force of the fluid pressure provides low resistance against manual movement of the sealing assembly to its open position, and in the active mode of the hydraulic circuit the biasing force of the fluid pressure is substantially increased to provide substantial resistance against manual movement of the sealing assembly to its open position whereby the substantial resistance against manual movement indicates that the hydraulic circuit is in its active mode.

10. A hydraulic circuit as set forth in claim 9 wherein the biasing force of the fluid pressure acting against the end surface of the valve closure is in the range of 5–20 lbs. in the inactive mode of the hydraulic circuit, and in the active mode of the hydraulic circuit the biasing force of the fluid pressure is at least 50 lbs.

11. A hydraulic circuit as set forth in claim 10 wherein the biasing force of the fluid pressure in the inactive mode of the hydraulic circuit is approximately 10 lbs and the biasing force of the fluid pressure in the active mode of the hydraulic circuit is approximately 60 lbs.

12. A hydraulic circuit as set forth in claim 9 wherein the valve seat is constructed of a polyimide material.

13. A bleed valve for bleeding fluid from a hydraulic circuit, the hydraulic circuit containing fluid under pressure and being operable in an inactive mode and an active mode, the fluid pressure in the hydraulic circuit being substantially increased in the active mode, the valve comprising:

a valve body having a valve passage therethrough adapted for fluid communication with the hydraulic circuit;

a valve seat on the valve body;

a sealing assembly comprising a valve stem disposed in the valve passage, a valve closure connected to the valve stem adapted for sealing engagement with the valve seat, and a push button connected to an outer end of the valve stem opposite the valve closure, the sealing assembly being moveable along a longitudinal axis of the valve passage between a closed sealing position in which the valve closure sealingly engages the valve seat to block fluid flow through the valve passage and an open position in which the valve closure is spaced from the valve seat to permit fluid flow through the valve passage, the push button projecting out from the valve body so that it is accessible for manually moving the sealing assembly to its open position;

the valve closure having an end surface adapted for exposure to the pressurized fluid of the hydraulic circuit whereby the pressurized fluid acts against the valve closure end surface to urge the sealing assembly toward its closed position, the amount of force needed for moving the sealing assembly to its open position being greater than the biasing force of the fluid pressure;

the end surface of the valve closure being sized so that in the inactive mode of the hydraulic circuit the biasing force of the fluid pressure provides low resistance of not more than about 20 lbs. against manual movement of the sealing assembly to its open position, and in the active mode of the hydraulic circuit the biasing force of the fluid pressure is substantially increased to provide substantial resistance of at least about 50 lbs. against manual movement of the sealing assembly to its open position whereby the substantial resistance against manual movement indicates that the hydraulic circuit is in its active mode.

14. A bleed valve as set forth in claim 13 wherein the biasing force of the fluid pressure in the inactive mode of the hydraulic circuit is approximately 10 lbs and the biasing force of the fluid pressure in the active mode of the hydraulic circuit is approximately 60 lbs.

15. A bleed valve as set forth in claim 13 wherein he valve seat is constructed of a polyimide material.

* * * * *